United States Patent [19]

Puzo

[11] Patent Number: 4,806,416

[45] Date of Patent: Feb. 21, 1989

[54] INSULATING COATING

[75] Inventor: Joseph P. Puzo, Montmirail, France

[73] Assignee: Axon' Cable S.A., France

[21] Appl. No.: 816,699

[22] Filed: Jan. 8, 1986

Related U.S. Application Data

[63] Continuation of Ser. No. 540,832, Oct. 11, 1983, abandoned.

[30] Foreign Application Priority Data

Oct. 15, 1982 [FR] France .................. 82 17435

[51] Int. Cl.$^4$ .................. B32B 15/00; B32B 17/00; B32B 27/00; H01B 7/00

[52] U.S. Cl. .................. 428/285; 428/286; 428/289; 428/290; 428/363; 428/365; 428/377; 428/324

[58] Field of Search .............. 428/363, 365, 324, 377, 428/285, 286, 289, 290; 174/110 FC, 121 R, 121 SR, 122 C, 122 G, 124 C, 124 GC, 110 SR, 120 C

[56] References Cited

U.S. PATENT DOCUMENTS

| | | | |
|---|---|---|---|
| 2,427,183 | 9/1947 | Berry | 428/363 |
| 2,459,653 | 1/1949 | Keyes | 174/110 FC |
| 2,485,691 | 10/1949 | Bogese | 174/110 FC |
| 2,606,134 | 8/1952 | Sanders | 174/110 FC |
| 2,691,694 | 10/1954 | Young | 174/110 FC |
| 3,226,286 | 12/1965 | Scheuer | 428/363 |
| 3,775,628 | 11/1973 | Andersson et al. | 428/363 |
| 4,079,191 | 3/1978 | Robertson et al. | 174/110 FC |
| 4,296,018 | 10/1981 | Smith et al. | 428/363 X |

FOREIGN PATENT DOCUMENTS

| | | | |
|---|---|---|---|
| 650654 | 2/1951 | United Kingdom | 174/110 FC |
| 1583954 | 2/1981 | United Kingdom . | |

OTHER PUBLICATIONS

"Glass Fabric Tape, Yarn Coated with Teflon" Chemical Fabrics Corporation.

*Primary Examiner*—Lorraine T. Kendell
*Attorney, Agent, or Firm*—Lerner, David, Littenberg, Krumholz & Mentlik

[57] ABSTRACT

Insulating coatings are disclosed which include an inner layer of glass fabric impregnated with a binding agent supporting particles of mica, followed by two additional layers, of either polytetrafluoroethylene or glass fabric, which readily adhere to each other. The polytetrafluoroethylene decomposes at temperatures of about 1,000° C., at which temperatures the glass fabric melts to convert the coating into a glass coated mica which can maintain its insulating properties both at those high temperatures and upon cooling to lower temperatures.

7 Claims, No Drawings

INSULATING COATING

This is a continuation of application Ser. No. 540,832 filed Oct. 11, 1983, now abandoned.

FIELD OF THE INVENTION

The present invention relates to an insulating coating which is capable of conserving its dielectric characteristics over a very wide range of temperatures.

BACKGROUND OF THE INVENTION

Safety imperatives require that, in certain cases of use such as are encountered in the nuclear, oil, aeronautic, space, naval, and chemical industries, those circuits which are conveying energy or transmitting monitoring or control signals must withstand the high temperatures which are due, for example, to fires, or, for electrical circuits, to abnormal rises in the intensity of the electric current which passes through them, for a sufficient period of time so as to enable personnel to be evacuated and equipment to be saved. In the case of short circuits or overintensity, it is also desired that the considerable increase in temperature of the conductor, or even the fusion thereof, does not provoke a fire by combustion of the coating.

Wholly or partly in response to these reuqirements, ceramic coatings, some of which are associated with glass fibers, have already been used. Furthermore, there are coatings, particularly for electrical cables, which result from the association of fabrics of glass fibers and metallic oxides.

The electrical cables intended for these uses exist in both reinforced and non-reinforced forms, depending on whether they are manufactured in a form which is protected from the risks of mechanical deterioration by a rigid metal coating, or whether they must be introduced into metal tubes during their assembly so as to insure the protection thereof.

The reinforced cables are made up of one or more conductors insulated by a substance with a low carbon content and protected by a cylindrical shell obtained by winding a metal ribbon, or by a metal tube. The non-reinforced cables are also made up of conductors insulated by substances with a low carbon content, but they are sheathed by a complex of glass fiber and sliliconed rubber, or any other non-combustible material.

Among these insulating coatings which present a considerable resistance to high temperatures, reference can be made to those described in the following patents: French Pat. No. 2,381,377, which describes a coating which comprises a metal tube packed with magnesia; French Pat. No. 2,257,555, which describes a coating composed of a layer of inorganic non-combustible fiber which constitutes a heat insulator, and a layer of halogen bonded to non-combustible fiber by a resin; French Pat. No. 2,462,771, which describes a coating comprised of baked insulating mineral matter impregnated with silicon oil and protected by a metal sheath; French Pat. No. 2,482,769, which describes a heat-resistant, flexible, refractory, insulating coating composed of a porous basic material and a refractory coating capable of melting with the basic porous material at high temperature; French Pat. No. 2,206,563, which describes a high temperature insulation composed of a borosilicate glass and silica, which is melted at high temperature to form a mass having a viscosity greater than the viscosity of the glass and the silica at the same temperature; French Pat. No. 2,360,530, which describes a fritted, vitrifiable body based on glass and quartz; U.S. Pat. No. 3,602,636, which describes a coating comprising a helical covering with a glass mterial, with open weave, bearing a coating of synthetic rubber which is flame-resistant, and is protected by a sheath of polyvinylchloride; U.S. Pat. No. 3,632,412, which describes a self-adhesive tape comprising an interpolymer lined with a glass cloth; U.S. Pat. No. 3,013,902, which describes materials coated with colloidal alumina; U.S. Pat. No. 3,095,336, which describes the preparation of laminated ceramic products with glass cloth; and European Pat. No. 80.107217.4, which describes an insulating coating of ceramics comprising a polyimide and mica.

In an attempt to respond to the particularly severe requirements of certain uses, particularly those on oil platforms, in the mining industries and in nuclear power stations, requirements have arisen for the installation of explosion- and fire-proof conduits. These types of installations, although limiting the effects of self-propagation and the release of fumes, have presented the drawback of confining the heat to inside the conduit, which has the effect of destroying the insulator, and of creating ruptures in the cables and short circuits therein.

In addition to the above, although insuring the protection of the electrical cables and maintaining the insulation indispensable for a predetermined duration, the majority of the above-mentioned prior coatings, do not allow the installations to be subsequently re-used without first having all of the wiring replaced. These destructive results are further accentuated when extinction means such as the projection of sea water or immersion are used.

All of this is also apart from the added problems faced by those fluid conduits which supply compressed gas or hydraulic liquid to remote equipment which may be vital to maintaining operations. The supple pipes which are generally used in these cases are only very imperfectly protected from direct heat, and they are not designed to resist a considerable rise in temperature for a sufficiently long time.

SUMMARY OF THE INVENTION

According to the present invention, these and other deficiencies in the prior art have been overcome by the invention of an insulating coating which is capable of maintaining its dielectric and thermal properties between −200° C. and 1000° C., and which is able to maintain its insulating properties at these high temperatures and also upon cooling down from these high temperatures. This is accomplished in accordance with this invention by the fact that when temperatures of about 1000° C. are attained in connection with this coating the glass fibers therein melt and are converted into a gel which is presented in the form of a pasty foam which constitutes a continuous dielectric and thermal barrier which reinforces the insulation and the degree of protection of the conductor or the conduit. After subsequent lowering of the temperature, this protective barrier is converted into a layer of glass-coated mica, the polytetrafluoroethylene having disappeared by combustion.

As a consequence, the coatings of this invention conserve their insulating characteristics and their tightness, even after destruction of the combustible elements which are included in its basic composition, i.e., the PTFE. This therefore results in conservation of the operational value of the installations even after a fire.

This particular feature is of considerable importance for the remote control of nuclear reactors after an incident has produced a considerable increase in temperature in the hot part, as well as for maintaining in operation that equipment directly responsible for the survival of personnel or for continuing a mission, as is particularly so in the case of aeronautics, in the navy, aerospace operations, and on drilling platforms.

Moreover, this coating may be obtained by ribboning, which makes it possible to envisage its use to protect certain fluid conduits which may pass through particularly exposed zones.

As stated above, the coatings of this invention are mainly characterized by the fact that they conserve their dielectric and thermal properties between $-200°$ C. and $1000°$ C., and in that the glass fibers therein melt and are converted into a gel, which maintains the insulation at high temperatures and insures insulation and tightness during cooling.

DETAILED DESCRIPTION

The insulated coatings of this invention are composed of a layer of mica, a glass fabric, and a layer of polytetrafluoroethylene (PTFE). The layer of mica is obtained by providing a winding of one or more layers of a ribbon of glass fiber fabric impregnated with a binding agent supporting particles of mica thereon. The layer of polytetrafluoroethylene, which is superimposed on the layer of mica, is obtained by winding one or more layers of the PTFE, or by extrusion thereof. The glass fabric which is superimposed on the layer of polytetrafluoroethylene is obtained either by winding a ribbon of such glass fabric, or by weaving elementary fibers thereof directly above that preceding layer.

The layer of mica is turned towards the conductor or the member to be protected, and that protection is completed by insuring adherence between the layers.

These ribbons will generally have a thickness of from about 0.06 mm to 0.12 mm, and they are wound with overlapping, for example by 50%, so as to double the thickness of the respective layer.

The gel of melted glass fibers which is obtained at high temperature then vitrifies during a subsequent drop in temperature, so that, along with the particles of mica which coat the element to be protected, they provide a dielectric, tight insulating coating connecting all of the components of the circuit.

This coating may be produced in the desired manner, such as from a ribbon obtained by the superimposition and adhesion of the various layers of materials which make up the composition hereof. This enables one to protect elements or components other than electrical conductors, and to reinforce the protection of existing installations against fire.

These coatings are in two forms, depending on whether one is interested in protecting a supple conductor, a rigid conductor, a connecting component or equipment in a particular form.

In the case of conductors, the ideal solution consists of the superimposition of a ribbon of mica, a polytetrafluoroethylene protective layer and a glass fabric.

In the case of the insulation of elements other than wires, the solution consists of the superimposition of a ribbon of mica, a glass fabric impregnated with polytetrafluoroethylene and polytetrafluoroethylene insulation.

Other characteristics and advantages of this invention can be appreciated with reference to the following description of a particular non-limiting example of a coating made according to this invention, which is intended for the protection of electrical conductors.

Such protection is thus effected during the manfuacture of these conductors in the following manner.

A ribbon composed of a glass fiber fabric impregnated with a binding agent, generally silicon, supporting particles of mica is provided, and is preferably wound about the conductor so that the particles of mica are turned towards the conductor. The winding can be carried out in one or more layers. A layer of polytetrafluoroethylene is then provided either by winding a ribbon of the PTFE or by extrusion thereof, over the preceding layer. A glass fiber fabric is then superimposed on the layer of polytetrafluoroethylene by ribboning or weaving elementary fibers thereof directly thereonto. The overall protection then is completed by polymerization of the polytetrafluoroethylene, which is present in various forms, i.e., by PTFE impregnation of the glass fabric, or by the covering of the fibers with the PTFE in the case of direct weaving, and by the continuous layer obtained by ribboning or extrusion. The effect of this polymerization is to obtain the adherence of the two upper layers, as well as a certain adherence of the layer of polytetrafluoroethylene with the ribbon supporting the particles of mica, when the latter are turned towards the conductor.

According to another embodiment, protection of flexible conductors may be obtained by superimposition of a ribbon of mica, as defined previously, of a glass fabric, in the form of a braid or a ribbon, and of any insulation of polytetrafluoroethylene obtained by ribboning or extrusion. The protection in this case is then completed by a treatment to obtain adherence between the layers similar to that described in the preceding embodiment.

The ribboning operations used in this invention are conducted with an amount of overlapping which is selected so that at all points of the periphery of the cable there are one or more thicknesses of each of the ribbons, whose width and thickness are defined as a function of the diameter of the wire.

The mica is turned towards the conductor in order to facilitate laying bare (i.e., stripping) of the conductor, which precedes various connecting operations, and in order to obtain a film of mica coated with glass after solidification of the melted glass gel which is obtained at very high temperature so as to facilitate disconnection of the coating if necessary.

Conversion of the coating hereof by heating to about $1000°$ C. followed by cooling may be sought a priori on rigid installations in which perfect tightness is necessary, for example, in order to shelter the components therewithin from an aggressive or damp environment.

In fact, coating of the conductors according to this invention may be extended to the other elements of the circuit by ribboning, so that after fusion and solidification of the coating the entire installation is continuously coated with glass, and consequently providing such a coating in tight manner.

The coatings according to this invention are mainly intended for the protection of electrical conductors, fluid conduits, connecting components or equipment against fire.

It is more particularly applied to the protection of electrical control, illuminating or safety circuits in the nuclear, chemical, oil, aeronautic, naval and space industries.

Although the invention herein has been described with reference to particular embodiment, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

I claim:

1. An insulating coating comprising a first layer comprising a layer of glass fabric impregnated with a binding agent supporting particles of mica, and superimposed on said first layer a layer of polytetrafluoroethylene and a layer of glass fabric, said layer of polytetrafluoroethylene and said layer of glass fabric readily adhering to each other, said polytetrafluoroethylene decomposing at temperatures of about 1,000° C. at which temperature said glass fabric melts so as to convert said coating into a glass coated mica, whereby said coating can maintain its insulating properties at such high temperatures and upon cooling from such high temperatures.

2. The insulating coating of claim 1 wherein said layer of polytetrafluoroethylene is applied onto said layer of said glass fabric.

3. The insulating coating of claim 1 wherein said layer of said glass fabric is applied onto said layer of said polytetrafluoroethylene.

4. The insulating coating of claim 1 wherein said binding agent comprises silicon.

5. The insulating coating of claim 1 wherein said particles of mica are disposed on the inner surface of said first layer.

6. The insulating coating of claim 1 wherein said first layer is provided by winding said layer of glass fabric impregnated with said binding agent supporting said particles of mica.

7. The insulating coating of claim 1 wherein said layers have a thickness of from about 0.06 to 0.12 mm.

* * * * *